(12) United States Patent
Wheals et al.

(10) Patent No.: US 7,509,194 B2
(45) Date of Patent: Mar. 24, 2009

(54) VEHICLE CONTROL

(75) Inventors: Jonathan Charles Wheals, Warwickshire (GB); Mark Ramsbotton, Lancashire (GB)

(73) Assignee: Ricardo UK Limited, West Sussex (GB)

( * ) Notice: Subject to any disclaimer, the term of this patent is extended or adjusted under 35 U.S.C. 154(b) by 0 days.

(21) Appl. No.: 11/778,477

(22) Filed: Jul. 16, 2007

(65) Prior Publication Data

US 2007/0288140 A1    Dec. 13, 2007

Related U.S. Application Data

(62) Division of application No. 10/480,224, filed as application No. PCT/GB02/02705 on Jun. 13, 2002, now Pat. No. 7,263,419.

(30) Foreign Application Priority Data

Jun. 13, 2001   (GB) ................................. 0114424.5

(51) Int. Cl.
 *G06F 19/00*   (2006.01)
 *G06F 17/00*   (2006.01)

(52) U.S. Cl. ................................. 701/36; 701/1; 701/33
(58) Field of Classification Search ................... 701/29, 701/33, 35, 1, 36
See application file for complete search history.

(56) References Cited

U.S. PATENT DOCUMENTS

| | | | | |
|---|---|---|---|---|
| 4,744,218 A | * | 5/1988 | Edwards et al. | 60/368 |
| 5,896,418 A | * | 4/1999 | Hamano et al. | 375/259 |
| 5,957,985 A | * | 9/1999 | Wong et al. | 701/33 |
| 6,002,975 A | * | 12/1999 | Schiffmann et al. | 701/36 |
| 6,012,004 A | * | 1/2000 | Sugano et al. | 701/33 |
| 6,038,500 A | * | 3/2000 | Weiss | 701/22 |
| 6,091,856 A | * | 7/2000 | Terane et al. | 382/246 |
| 6,301,534 B1 | * | 10/2001 | McDermott et al. | 701/41 |

* cited by examiner

*Primary Examiner*—Tan Q Nguyen
(74) *Attorney, Agent, or Firm*—Osha • Liang LLP (57) ABSTRACT

A vehicle control system includes at least one driver input, a supervisor and at least one sub-system controlled by the supervisor. The supervisor assesses the driver input to establish actual driver demand and controls the sub-systems accordingly. As a result intuitive driver demand is identified and met.

6 Claims, 4 Drawing Sheets

VEHICLE CONTROL

CROSS-REFERENCE TO RELATED APPLICATIONS

This is a divisional application and claims benefit under 35 U.S.C. § 120 of U.S. patent application Ser. No. 10/480,224, filed on Dec. 10, 2003.

BACKGROUND OF INVENTION

1. Field of the Invention

The invention relates to improvements in vehicle control.

2. Background Art

In conventional systems process for developing passive suspensions involve vehicle modelling and simulation to vary parameter values to achieve an acceptable compromise between competing vehicle attributes such as ride and handling within a given suspension working space. Controllable suspension elements (such as switchable dampers, controlled roll bars and variable spring elements) have been introduced to maintain the lateral force generating capability of the tyre contact patch. This is achieved by control of wheel camber, steer angle and normal loading and, generally speaking, controllable suspension elements are compatible with all systems which vary applied wheel torque since the systems are complementary. In a similar way, systems contributing to wheel torque (engine, transmission, active drive line) have been developed. However in many conventional systems the different elements are controlled by distributed autonomous controllers giving rise to significant conflicts.

In one known system a supervisor assesses driver demand from inputs such as steering wheel and accelerator pedal and provides a vehicle output in the form of speed, torque and so forth based on safety considerations. This approach has various limitations. First of all if the driver increases demand beyond a limit then no additional response is seen. Furthermore the driver is not provided with feedback as to the effect of the inputs he is providing and whether he is approaching a limit condition. As a result driver demand may not be met, or the driver may not be able to detect this which is unsatisfactory to the driver. Yet further known systems are not able to fully determine the current vehicle state including parameters that significantly affect performance and safety, such as vehicle slip angle, further degrading their performance.

A further problem with known systems is that different driver inputs for example steering and accelerator pedal may present conflicting messages. This can especially be the case where an inexperienced driver, in an attempt to signal demand, controls the vehicle inexpertly during a difficult manoeuvre (for example backing out during a limit handling manoeuvre) or indeed a very experienced driver carries out highly skilled maneuvers such as applying an "opposite lock" during a manoeuvre. Such conflicting signals can be misread by existing systems giving rise to significant performance and safety concerns.

Yet a further problem with known systems in encountered in the existing control hierarchy model. Known systems include a supervisor and sub-systems comprising multiple actuators such as brake, chassis, suspension, torque differential controllers. In these known systems the actuators can carry local sensors to detect a current operating condition. As a result when the supervisor sends a command to the actuator the actuator may override the command as a result of the current operating conditions. This is especially a problem in the automobile sector where many of the sub-system actuators are proprietary to different manufacturers such that conflict can often arise. As a result the performance of the vehicle as a whole is compromised because the supervisor does not have fully integrated control. Yet further the supervisor in conventional systems simply sends out set points to be met by each actuator which is inflexible, requires constant update and may also provide risk of failure modes.

The invention is set out in the appended claims.

BRIEF DESCRIPTION OF DRAWINGS

Embodiments of the invention will be now be described with reference to the drawings of which.

DETAILED DESCRIPTION

In overview the present invention provides a vehicle control system in which driver inputs such as steering wheel and accelerator pedal to the supervisor are effectively de-coupled to assess true driver demand for example in instances where the inputs are potentially conflicting. From this, vehicle output parameters can be derived such as the required vehicle slip or yaw rate.

The supervisor then controls vehicle sub-systems according to known techniques and provides appropriate set points to each sub-system such that the desired vehicle output parameters are achieved. As a result the system interprets and meets the driver demand providing for example a power oversteer capability.

The system is enhanced by using external information for example the use of global positioning system (GPS) to assess vehicle slip in conjunction with measurements of yaw rate and acceleration and electronic compasses as multiple inputs to Kalman filters. The system also provides intelligent demand interpretation; for example if the driver demand exceeds possible vehicle performance then the system will provide the best comparable performance. Yet further, because the system is able to assess instantaneous vehicle performance it can provide feedback to the driver through the vehicle—for example through the steering wheel—such that the driver will know how the vehicle is performing and for example whether a limit condition is being approached.

The control system includes a supervisor and sub-system actuators and achieves full sub-system integration by returning sub-system sensed local conditions to the supervisor such that the supervisor can take these into account before sending commands to the sub-system. As a result the possibility of denial by a sub-system of operation will not occur.

The system also allows predictive control such that the sub-system can send to the supervisor predicted local conditions allowing yet further integration of the sub-systems to provide optimised vehicle performance. Similarly the supervisor controls the sub-system not only by sending basic set points but also by sending an operating envelope to the subsystem such that if certain conditions are met the sub-system is instructed to carry out appropriate steps in response. This capability is especially useful in the event of communications failure between the supervisor and subsystems, allowing the sub-systems to continue to function using the estimate of preferred actions from the supervisor prior to such communications failure.

As a result the driver interface is interpreted to define a demand a demand for future spatial positioning using path curvature for example as a primary target Variables such as yaw rate and yaw acceleration are considered as intermediate targets.

Figure 1:
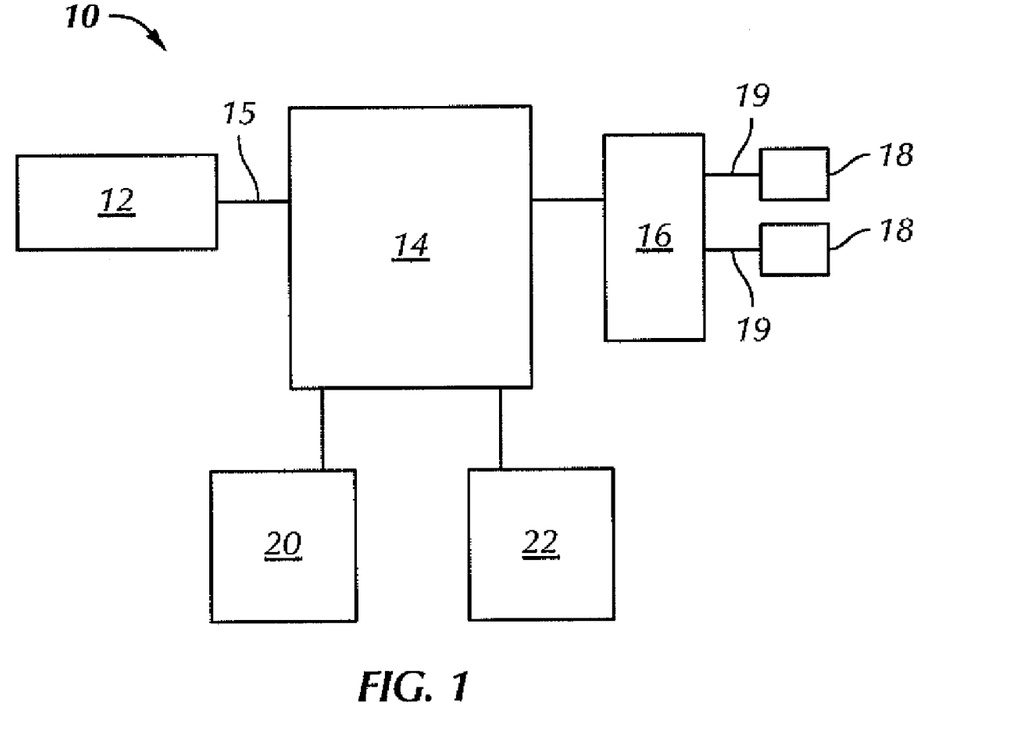
FIG. 1 is a block diagram showing inputs to and outputs from a vehicle control supervisor.

Referring now to FIG. 1 the vehicle control system is designated generally (10). The system includes a supervisor (14) which communicates with sub-systems (18) via a safety block (16) and control lines (19). The supervisor can send desired set points to the sub-systems or an operating envelope in the form, for example, of a future conditional imperative command as discussed in more detail below. The supervisor also receives from the sub-systems both current and predicted local conditions allowing further control integration. The safety block (16) is provided to interpret and assess safety conditions for any commands sent to the sub-systems and can override the commands if necessary.

The subsystems (18) comprise actuators including transmission, chassis, drive line, brake and so forth actuators as well as local condition sensors. The sub-systems also include predictive capability allowing prediction of future local conditions. As a result both current and future operating conditions are returned to the supervisor. Although the predictive capability could be carried out at the supervisor it is preferred for it to take place at the sub-system as the subsystem may well be proprietary and manufactured by a different body than a supervisor and hence better configured to carry out this function.

Various other inputs are also provided to the supervisor (14). The driver input is designated generally (20) and can include steering wheel angle/turn rate, accelerator pedal position and rate, gears, clutch and brakes. As discussed in more detail below in relation to FIG. 3, these inputs can be de-coupled and interpreted according to improved algorithms to assess actual driver demand.

A sensor pack (22) also inputs to the supervisor (14) information on general vehicle conditions. As discussed in more detail below this can include GPS data allowing assessments of, inter alia, vehicle yaw rate and vehicle slip angle. In particular in relation to slip angle using next generation GPS techniques together with inertial data all the relevant information to assess slip angle can be derived preferably using Kalman filtering techniques. Recent improvements in differential GPS has allowed accurate measurement of longitudinal and lateral speeds. Future GPS systems will improve resolution and the rate of data supply making this technology more applicable to the control of vehicle dynamics. Such information would reduce reliance upon estimated values of vehicle operating states within known vehicle control strategies. Accordingly it will be clear to the skilled person how GPS information can be incorporated in such known strategies to obtain a more accurate estimate of vehicle slip.

A further input to the supervisor (14) in a preferred embodiment is the Driver's Sportiness Index (DSI). This is a value ranging between zero (low sportiness) to one (high sportiness) which can be used to modify the performance of the vehicle. Although the intermediate values can be continuous or discreet, in the preferred embodiment they are discreet as a result of which, they can be simply incremented or decremented. The DSI value can either be determined from detecting the driver's behaviour and driving style or it can be controlled by the driver. The DSI value may be applied as a scalar gain to increase the responsiveness of the vehicle dependant upon driving style. The same value may be used to adapt all vehicle systems, rather than each subsystems having as separate algorithm which may cause a disparity in the responsiveness of different vehicle sub-systems, which may be disconcerting to the driver and/or cause the vehicle to be less easily controlled.

For example certain conditions may arise where automatically adapting DSI value may not suit road or traffic conditions or driver's preference. Under such conditions, a HMI device is provided to allow alteration. Such a HMI device may input elements to indicate the driver's intention with respect to the following operations acting upon the realtime value of the DSI metric: The device has the following features and functionality:

1. Plus Increment. Adds one DSI increment per press operation
2. Minus Increment. Subtracts one DSI increment per press operation
3. Auto. (Automatic). Allows the system to set DSI output value according to the adaptive algorithm . . . or automatic mode which responds to driving style.
4. Zero. Sets the effective DSI value to zero and stores the previous value.
5. Res. (Resume). Sets the effective value of DSI prior to Zero operation
6. Numerical display of DSI value
7. Graphical display of DSI value The input elements are preferably momentary switches of mechanical, magnetic, capacitative or optic design which are connected to the driveline ECU or part of a vehicle communications bus.

The switch devices will preferably have a force/travel characteristic to allow definite operation and prevent inadvertent operation due to movement of the vehicle on uneven surfaces.

The preferred design allows each "click" of the plus/minus switches to add or subtract a discrete increment For example, the DSI metric may be defined to be within the range 0.0 to 1.0 and to be variable in steps of 0.2 units. This allows the driver to make quick and easy sequential selection for both increases and decrease of DSI.

Alternatively DSI could be varied within the same bounds as a continuous variable in which the time the plus/minus switches are pressed is multiplied by a DSI rate factor to yield a variation in DSI.

The value of DSI is held if the vehicle engine is switched off for less than 60 seconds or other prescribed time, otherwise it is set to zero during the next engine starting procedure and before the vehicle next moves.

Text, Numeric or graphical indication of the current value of DSI may be provided for the information of the driver.

The DSI value generated by the adaptive DSI algorithm may be overridden in the following order or priorities:
1. Ultimate Stability/Safety
2. HMI
3. Adaptive DSI When overridden, the pre-existing value of DSI is re-instated gradually after the condition which caused the override no longer exists.

Figure 2:
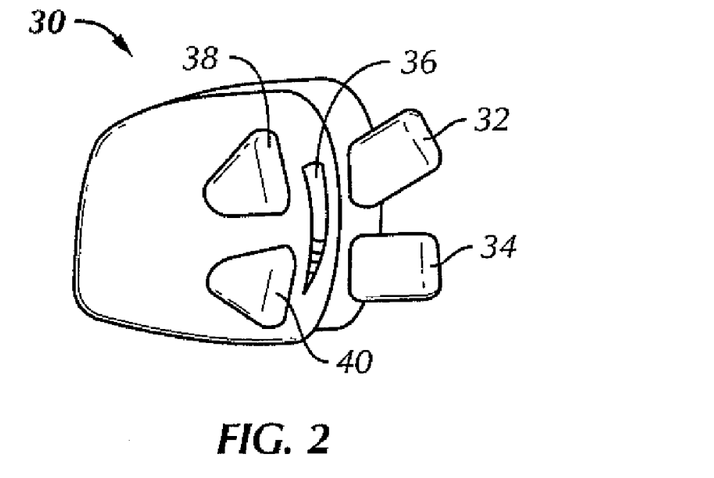
FIG. 2 shows a control module for controlling a metric referred to as driver sportivity index.

Referring to FIG. 2 one possible module for allowing the driver to vary DSI is designated generally (30). It includes an increment or tip-up button (32) and a decrement or tip-down button (34) allowing the driver to vary the DSI between zero and one as shown on a display (36). The system also has a resume button (38) and a normal button (40). In certain circumstances, such as emergency conditions, the DSI may be automatically set to zero reset by the supervisor or by the driver pressing the pause/zero button (40). When those conditions have passed then the driver can resume the desired index using resume button (38).

In cases where the system automatically determines DSI algorithms with inputs of accelerator pedal position, brake pedal pressure, gear ratio shift frequency; vehicle lateral acceleration; vehicle longitudinal acceleration; vehicle yaw rate; vehicle slip angle; individual wheel angular speeds; rotational velocity of the engine; kick-down switch if fitted; Sound Pressure Level in Cabin (SPL dBA-wighted); Spectral density of specific vibration frequencies in and around the vehicle cabin and other variables are used to establish a DSI metric for control of longitudinal dynamics. This has been extended further to include other variables to establish a more comprehensive metric for automatic adaptation of lateral and yaw vehicle response.

The metric is used to vary the controlled response of the vehicle for both longitudinal and handling responses.

The following variables and time derivatives are treated as inputs to an algorithm to estimate DSI: accelerator pedal position; brake pedal pressure; gear ratio shift frequency; steering wheel position; lateral acceleration; longitudinal acceleration; yaw rate; slip angle. The inputs are treated with the following mathematical operators: Min, Mean and Maximum value within sampling window; Min, Mean and Maximum proportion of maximum possible signal value within sampling window; and bandpass filtering. The algorithm to estimate DSI can be a Neural Network; a Fuzzy Logic controller; or Point Score and Decay Summation. In the last of these the occurrence of each parameter triggers an increment to a running summation of that parameter. Also each parameter would have a specific time-based decay rate such that the score associated with the particular parameter would decrement/reduce when the parameter did not exist or did not exceed some calibratable threshold. A further possibility is CARLA (Continuous Action Reinforcement Learning Algorithm)—a known method.

Figure 3:
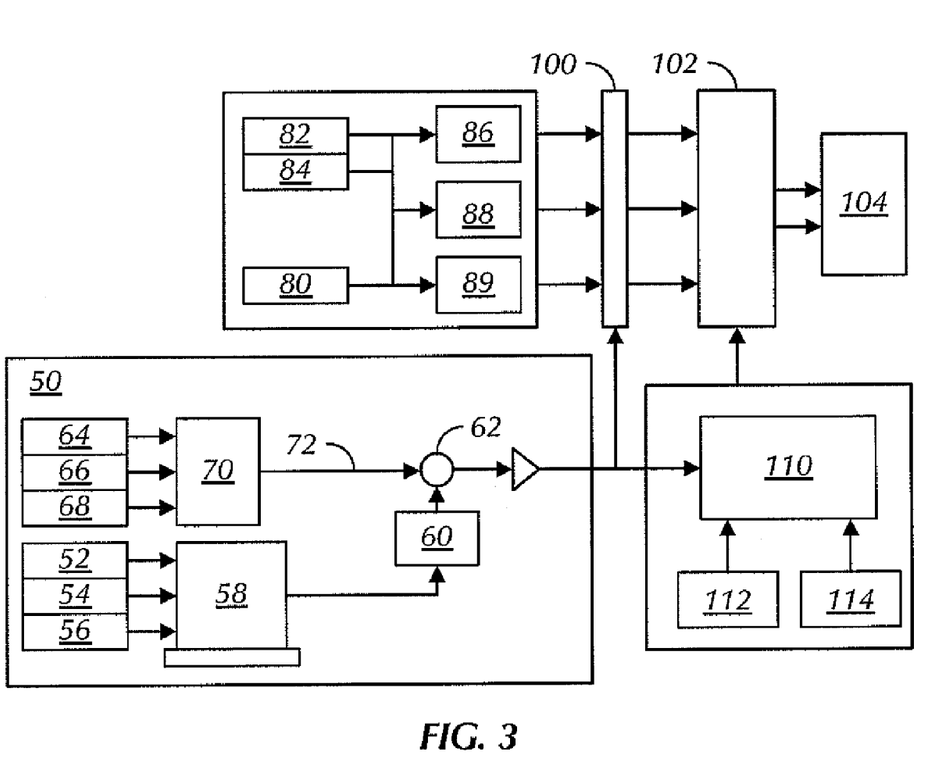
FIG. 3 shows an algorithm allowing de-coupling and interpretation of driver input.

Referring now to FIG. 3 the algorithm for defining targets for yaw rate and vehicle slip angle is demonstrated. In the embodiment shown two driver inputs, accelerator pedal interpretation (50) and steer wheel interpretation (80) are shown. These are de-coupled and interpreted to provide desired vehicle output parameters of slip angle and yaw rate as discussed in more detail below to better meet driver demand.

The accelerator pedal interpretation system (50) includes as input driver demand pedal position (52), brake pressure (54) and longitudinal vehicle velocity $v_x$ (56). These are input to a driver demand map (58) suitably calibrated and from this a demand for tractive force is passed through rate limit filters (60) to a comparator (62). A further input to the comparator (62) is a system assessment of the tractive force required to maintain current states, (72). This is obtained from measured or sensed values of longitudinal acceleration $a_x$ (64), longitudinal velocity $v_x$ (66) and lateral acceleration $a_y$ (68). These sensed values are input to a simple vehicle model (70) to obtain the tractive force value from known performance data. The output of the comparator comprises the excess driveline torque demand. The algorithm comparison is made between the following: total driveline torque (tractive force) that when distributed between the vehicle wheels either by driveline or other devices is required to maintain the steady velocity of the vehicle on the existing path defined by the radius of the instantaneous circle described over the ground; and total driveline torque (tractive force) demanded by the driver (from a calibratable map that defines transmission output torque as a function of accelerator-pedal position and vehicle speed).

The difference between these values can be used in alternative ways including as an input to a calibratable map which define targets for vehicle slip angle and or yaw rate, with other input variables which may include vehicle speed and lateral acceleration or as a multiplication factor applied to targets derived from interpretation of steering wheel angle and time derivatives as discussed above with reference to comparator 62.

Three cases then exist from this comparison and the associated control actions are as follows:

The first case is where demanded driveline torque and the driveline torque required to maintain the vehicle's steady state are EQUAL. This means the vehicle is balanced and the current targets for slip angle are maintained at its current value.

The second case is where demanded driveline torque is GREATER than the driveline torque required to maintain the vehicle's steady state path. The vehicle is accelerated until the existing vehicle's trajectory can no longer be maintained by lateral tyre forces on the prevailing surface. If the steering wheel position is maintained constant, then in this condition the system acts to increase the magnitude of vehicle slip angle whilst approximately keeping the vehicle's centre of gravity on the previous trajectory causing further "turn-in". This transition is achieved at a rate dependent upon factors such as time derivatives of accelerator-pedal position, steering wheel angle and vehicle speed. If the comparison variable is of sufficiently sustained positive magnitude then the slip angle is controlled up to a calibratable maximum (dependent upon metrics associated with Surface friction coefficient and Driver Skill Metric). Excess is then interpreted to increase the vehicle speed by allowing the vehicle to move to a trajectory of larger radius assuming approximately constant lateral acceleration.

The third case is where demanded driveline torque is LESS than the driveline torque required to maintain the vehicle's steady state path. In this condition the system acts to decrease the magnitude of vehicle slip angle. This transition is achieved at a rate dependent upon factors such as time derivatives of accelerator-pedal position, and steering wheel angle. The vehicle is decelerated maintaining the vehicle's existing trajectory. If the steering wheel position is maintained constant, then in this condition the system acts to reduce the magnitude of vehicle slip angle whilst approximately keeping the vehicle's centre of gravity on the previous trajectory. This transition is achieved at a rate dependent upon factors such as time derivatives of accelerator-pedal position, steering wheel angle and vehicle speed.

The steering wheel interpretation at block (80) receives as inputs the longitudinal velocity of the vehicle $v_x$ (82) and the steering wheel angle $\delta$ (84). The desired outputs are required lateral acceleration $a_y$, yaw rate $\dot{\psi}$, and yaw acceleration $\ddot{\psi}$. To obtain these the inputs (82) and (84) are both provided to respective uncoupled nominal maps (86), (88), (89) which can be composed and calibrated in any appropriate fashion for example empirically, to give the desired output values. Optionally a further transient effect $\dot{\delta}$, the rate of change of angle of steer wheel, can be input to nominal map (89) to obtain $\ddot{\psi}$. The outputs from the accelerator pedal interpretation block 50 and the steering wheel interpretation block 80 are received by a weighing matrix (100) which can include transient factors. They are combined here together with any factor introduced by DSI to give output values for the desired $a_y$, $\dot{\psi}$ and $\ddot{\psi}$. These are input into an inverse vehicle model (102) which in turn extrapolates backwards to obtain the slip angle β and yaw rate $\dot{\psi}$ target values which is desired for the vehicle to obtain. As discussed further below the supervisor then controls the sub-systems according to known algorithms to achieve those target values.

A further component is a slip angle target limiter (110). This allows external factors such as vehicle/road co-efficient of friction μ and driver skill to be taken into account when assessing the demand from the driver. A maximum slip angle $β_{max,\ skill\ level}$ is output to the inverse vehicle model (102) to modify the output β and $\dot{\psi}$ appropriate to the conditions.

The variation in μ within a variable historic time window is considered using known methods. If the μ estimate is approximately equal at each wheel, and is consistent in time, then a high measure of confidence is assigned to this parameter.

The following parameters are derived: μ averaged over all the wheels; μ for each wheel, used as a measure of surface homogeneity; and time derivatives of the above, used as a measure of surface homogeneity and to judge how rapidly the surface is changing. Once friction has been determined, further parameters such as path curvature from known position on known route from GPS and stored road information, longitudinal and lateral gradient of the road surface approached and traffic proximity from either on-board or externally transmitted devices can be taken into account in relation to general operation of the vehicle.

For the driver skill metric an algorithm is proposed which estimates using known methods the skill of the driver in performing a particular manoeuvre or series of maneuvers and assigns a numeric value in the range 0-1. The algorithm compares combinations of driver actions and vehicle responses that are known to represent skilled and unskilled driving. Inputs to the algorithm include the following parameters and their time derivatives: steer angle, gas pedal angle, brake pedal pressure, longitudinal velocity, lateral velocity, yaw rate.

Both these parameters—μ and driver skill metric are used to vary the targets for slip angle and yaw rate to improve the safety of the vehicle, surface and driver combination.

The driver may be alerted by feedback to the approach of a limit handling condition by a variation in steering wheel torque (steer-by-wire assumed) and or other haptic cue and or acoustic or graphic display.

Logic within the strategy must recognise the condition of "opposite lock" (counter-steering) used by some experienced drivers and not assume that the driver now wishes to follow a radically different path. This is achieved by ignoring gross directional requests during the manoeuvre that closely coincide with recorded steering modulations of a variety of drivers. The preferred algorithm is a neural network but fuzzy logic techniques could also be applied.

The system allows the vehicle to be controlled at higher slip angles and/or yaw rates by drivers of average skill than existing vehicle control systems by de-coupling the operation of the steering device and the accelerator pedal. This capability may then be applied to give greater vehicle responsiveness to driver inputs whilst maintaining vehicle stability.

A benefit of the system is that in a conventional RVD vehicle yaw instability may be caused by rapid reduction in driveline torque. Such a condition may arise when an inexpert driver "backs-out" during a limit handling manoeuvre which may cause irrecoverable instability. In the proposed control scheme the driver's actions are interpreted to mean that both the vehicle slip angle and longitudinal velocity are to be reduced with a primary emphasis of controlling yaw rate. In this way the vehicle remains stable despite the actions of the driver.

As a result it can be seen that the driver inputs are effectively de-coupled such that steer angle indicates desired steer path of the vehicle's centre of gravity and the accelerator pedal indicates desired speed and variable slip angle, independently assessed to determine true driver demand and then combined to obtain desired vehicle output parameters slip angle and yaw rate which are interpreted by the supervisor and which are currently obtained by control of the relevant sub-systems to desired set points.

Figure 4A:
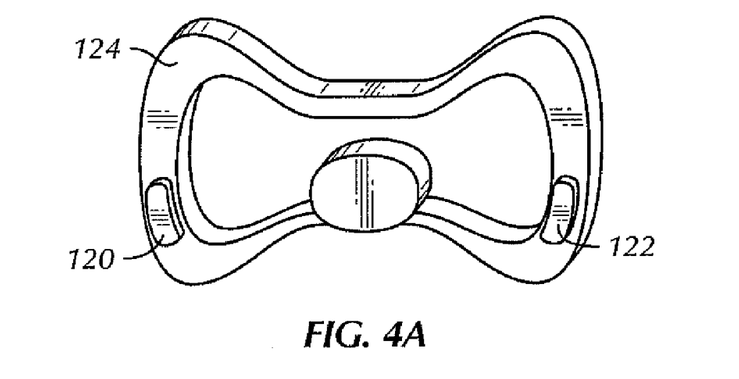
FIG. 4a shows a steering wheel allowing additional driver autonomy.
Figure 4B:
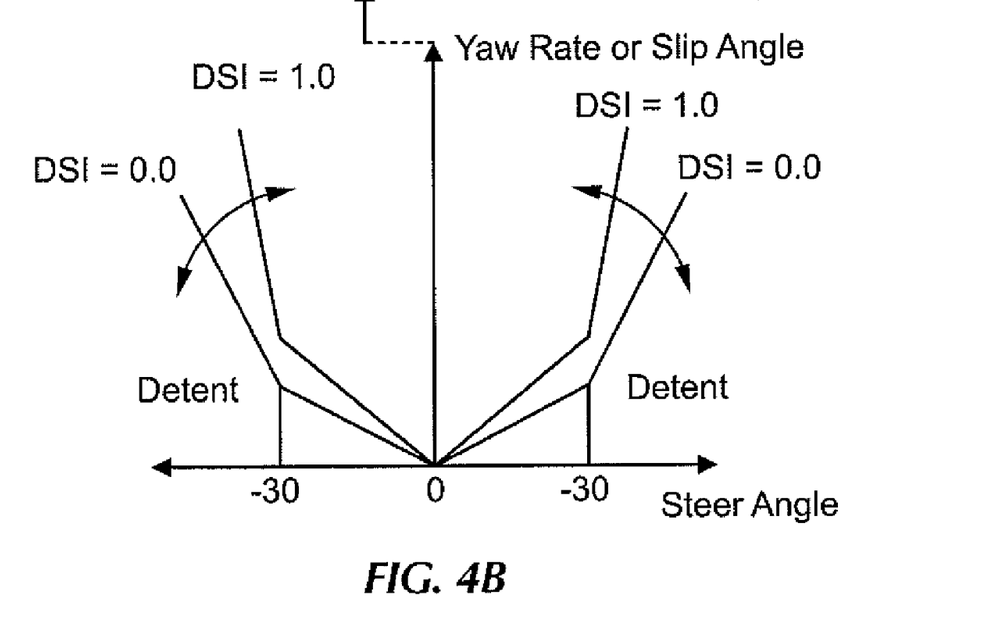
FIG. 4b shows a graph of yaw rate or slip angle against steer angle.

The system can introduce additional levels of driver autonomy. For example referring to FIG. 4a the driver can access enhanced steering wheel control and in particular overcome a mechanical stop against rotation of the steering wheel beyond, say 30 degrees, using buttons (120), (122) on a steering wheel (124). Further safety mechanisms can be based elsewhere ensuring that the buttons (120), (122) are not released inadvertently. As a result an additional level of steer response can be obtained as shown in FIG. 4b, and it can be seen that the gradients in both regions can be altered dependent on the DSI. In a first, normal region, a lower gradient linear yaw response is obtained dependent on steer angle. In a second, higher gradient region a more aggressive linear yaw response is obtained. The high yaw moment can be generated for example by applying brakes to the inner wheels and/or applying positive torque to the outer wheels to provide a very fast hairpin cornering. Preferably the high gain period times out if the system is not used in a predetermined time, and the buttons should not prevent the steering wheel being returned to the low gain portion, both for safety reasons.

Figure 5:
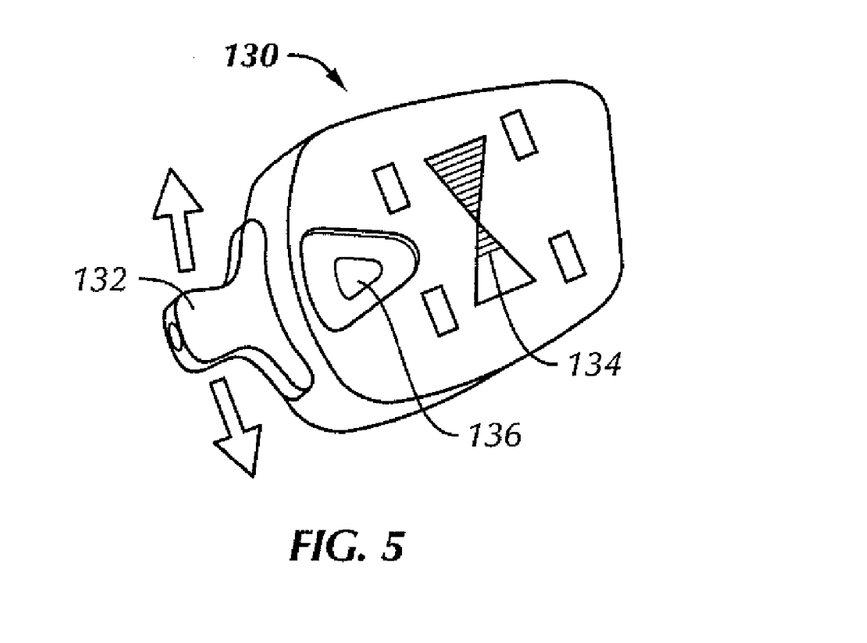
FIG. 5 shows a differential control allowing additional driver autonomy to vary torque distribution.

In addition the driver can autonomously control aspects of the vehicle performance using the device shown in FIG. 5 which allows the driver to vary driveline torque ratio front to rear. The device (130) includes a toggle or joystick (132) which can be manipulated in opposing directions to vary the ratio front to rear. A display (134) shows the current ratio and a "normal" button allows the driver manually to return to a default ratio. The device would have a nominal torque split (say front 40% and rear 60%) with the device (130) in its free position.

It will be appreciated that the extra autonomy provided in FIGS. 4 and 5 can be applied in parallel to control of the DSI. Yet further the vehicle can be configured for specific driver requirements by calibrating the appropriate maps and control systems accordingly.

Figure 7:
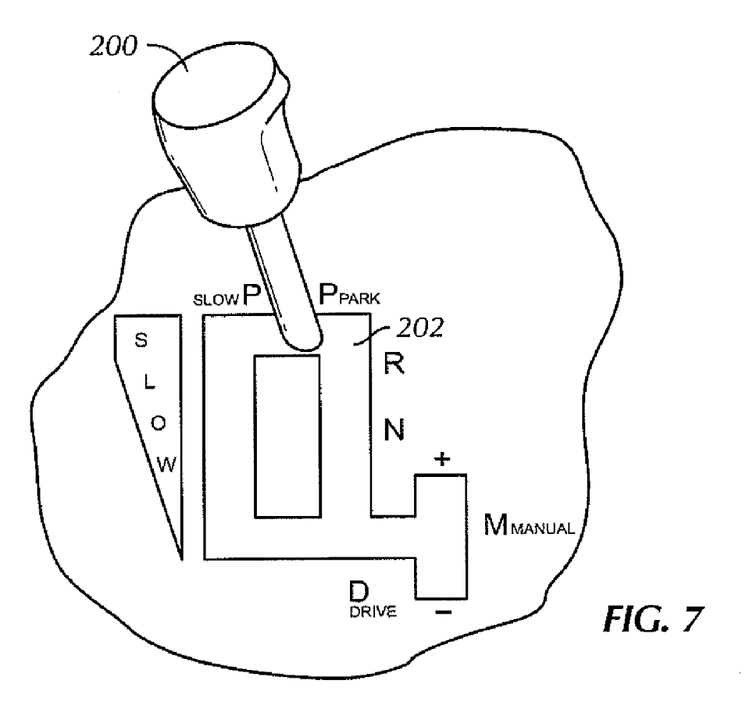
FIG. 7 shows a multiple control lever functionality.

Referring to FIG. 7 a single gear/brake control is shown, removing the need for a separate handbrake. The control includes a control lever 200 movable in a complex channel 202. In a first portion of the channel movement of the lever 200 top to bottom provides progressive retardation of the vehicle. Other portions provide automatic-style functionality including reverse, neutral and park capabilities as well as adaptive drive mode. In this last mode a tiptronic style control is provide allowing the driver to increment/decrement gears by shifting the lever 200 in the relevant direction for a brief period. Finally a handbrake portion of the channel is provided.

Figure 6:
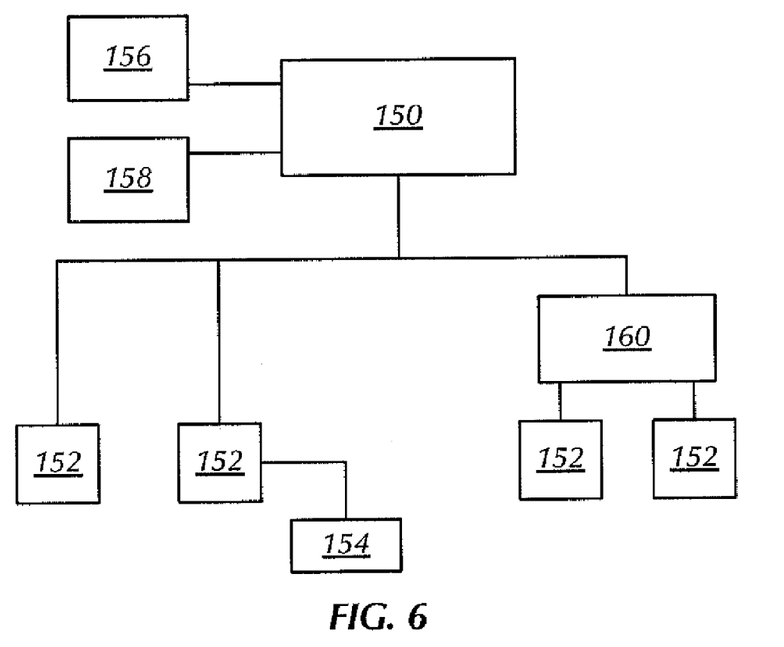
FIG. 6 shows a supervisor hierarchy according to the present invention.

Referring now to FIG. 6 a control hierarchy between a supervisor (150) and a plurality of subsystems comprising smart actuators (152) is shown. As discussed above the smart actuators are in two-way communication with the supervisor providing current and predicted local operating conditions where appropriate from a local sensor (154). A further input to the supervisor is external sensor information from a sensor pack (156) providing, for example, lateral and longitudinal acceleration information and yaw information together with GPS information providing instantaneous velocity and positional data (158). In the preferred embodiment subsets of sub-systems (152) can be grouped and controlled by an intermediate group manager (160) for closely coupled sub-systems such as powertrain, active driveline and brakes (for torque control) or roll-bars, dampers and springs (for chassis control). This hierarchy provides a level of integration ensuring that optimised vehicle performance is available. Yet further improved communications protocols between a supervisor and sub-system can be achieved in particular allowing the supervisor to provide more than set points to the sub-system and hence enhance operation. Using the hierarchy described above driver demand and subsystem activity are decoupled allowing greater flexibility in defining the combination of sub-system states with gives the desired vehicle response for the minimum "cost." Where cost is a multi-dimensional expression (using known techniques associated with Optimal Control) comprising elements relating to the following:

1) objective variables correlated to subjective measures
2) objective variables relating to mechanical durability, fuel economy and environmental factors such as exterior noise. Provision is also made to take influences from externally transmitted signals to vary weightings where trade-offs exist, for example vehicle responsiveness and exterior noise.

We turn now to the communication protocol adopted in more detail. In the following discussion a smart actuator is a device that allows physical sensing or accurate local inferred signal to allow modulation of internal control elements to achieve closed loop operation to meet an external demand for sub-system performance, and dumb actuators are those that allow external control signal for modulation of internal control elements and provide inferred sensing for quasi-closed loop operation As an example consider a driveline device that is intended to divide torque between two outputs according to an external signal. If the device was fitted with torque sensors at the each output then closed loop control of the variable elements within the device could be achieved using physical sensing—Smart Actuator. Alternatively, if the supervisor send a demand signal for the modulation of an internal control element of a driveline device, without direct reference to the desired set point, then this would be an example of Dumb Actuation. The strategies may be applied to a network of distributed ECUs or be applied in partitions within a single ECU.

Reviewing firstly the supervisor function, the purpose is the optimal integration of sub-systems to achieve system function at minimum "cost". As a result the system targets and vehicle attributes are: co-ordination of arbitration(s); co-ordination of sub-system failure modes; abuse protection/; monitoring; interpreting driver inputs (HMI); telematic input handling; coordination of PnP.

The messages can comprise signal I/O; Control Area Network (CAN(s)); reading "global" sensor pack, and telematics. The message out (from Supervisor) can be Current Imperative (action now !) or Future Conditional Imperative (action if !). This last messages particularly important as the supervisor can set an operating envelope in the form, for example, of an instruction set, for one or more actuators. In this case an instruction is sent to the sub-systems and stored for future reference. The message specifies a future action (positive or inhibit) to be undertaken by the sub-system if a specific or fuzzy set of circumstances arise. The message may take the form of a portion of control code which is assembled as a new component of the sub-system's control strategy. The new component may be specified with means of effective removal which may be a chronologically defines expiry date or an interpretation of input signals. For example, every nth message from the supervisor may carry instructions on how to operate in case of failure of one or a combination of other components even to extent that a secondary network between sub-systems can be invoked in case of failure or for failure notification purposes.

The messages in (to Supervisor) can include: permission request to Supervisor for local action (can I open clutch, please ?); request to Supervisor for remote action; local diagnostic; and local function limitation (current and future).

Turning to the sub-system function, the purpose is control of primary sub-system function(s), the main functions(s) being: durability; controls of mechanical unit; has local ECU including mechatronic design; reads local sensors; self diagnostics; tamper recognition; self-calibration; I/O failure mode; limp home strategy; PnP. The messages can comprise Signal I/O—CAN and reading local sensors.

As above, the messages in (from Supervisor) can comprise Current Imperative (action now !) or Future Conditional Imperative (action if !). The messages out (to Supervisor) are permission request to Supervisor for local action (can I open clutch, please !); request to Supervisor for remote action; local diagnostic; warning of local function limitation (current and predicted). Again this last is significant as it allows the subsystem to provide predictive/preventative information to the supervisor, enhancing operation.

An example of a communications exchange might be as follows: messages out (to Subsystems): Current Imperative (action now !); Definition of functional envelope; Local diagnostic; Future Conditional Imperative (action if!). Messages in (from Sub-systems): Permission request to Supervisor for local action (eg. can I open clutch, please ?); Request to Supervisor for remote action in another system (eg. ask the engine to produce 140N.m, please); Warning of local function limitation (current and future) (eg. be advised, max. coupling torque=1300 N.m).

The system set out here deals with conflict difficulties in known systems. In such systems conflicts do not arise when the operation of each of the systems is restricted to an exclusive portion of the vehicle operating space. However, this is an unlikely situation, and the reality of ad hoc connection of ECUs is well known to cause conflicts.

An example of integration for current vehicles relates to the interaction of engine and automatic transmission in which the transmission is permitted to request a reduction in torque during a shift, although neither system is deemed to have an elevated hierarchy. The generalised network architecture of a centralised co-ordination of all vehicle systems shown in FIG. 6 on the other hand provides a Supervisor and Smart Actuator in a well defined hierarchy.

Applying the strategies previously discussed, the Supervisor would send set-point targets to each of the subsystems. For example, the engine management system (EMS) would receive a command to produce 240 N.m, the transmission a command to maintain 3rd gear and the torque vector center differential (TVCD) and command to achieve a bias of 70:30. In this case each of the sub-systems is responsible for the detailed, local control of its own mechanisms and is therefore likely to be of mechatronic design. The Supervisor can have two sets of targets, one for predominantly straightline control of the powertrain and a second for control of chassis systems for lateral dynamics; between the two, TVCDs straddle this distinction. The communication protocol between the Supervisor and Smart Actuators and the potential for additional communication between the Smart Actuators effectively defines the hierarchy of the network.

One appropriate message structure to accommodate the invention is set out in the Table below, allowing integration of systems although from different suppliers. This is preferably applied as an extension of existing CAN communications protocol(s).

| | Supervisor | Smart Actuator/ Local Sub-system |
|---|---|---|
| Purpose | Optimal Integration of sub-systems to achieve system function at minimum "cost". | control of primary sub-system function(s) |
| System Targets | Vehicle Attributes | Sub-system targets (eg shift quality for transmission) Durability |
| Tasks | Determination of set points for each sub-system Co-ordination of arbitration(s) Co-ordination of sub-system failure modes Abuse protection/monitoring Interpreting driver inputs (HMI) telematic input handling Co-ordination of PnP | Control to set point from supervisor Read local sensors Self-calibration Self diagnostics Tamper recognition I/O failure mode Limp home strategy Provide PnP data |
| Inputs | Physical CAN(s) or other Driver Interface "global" sensor pack Telematics Messages IN (from sub-systems) Permission request to Supervisor for local action (can I open clutch, please ?) Request to Supervisor for remote action in another system Local diagnostic Warning of local function limitation (current and future) | Physical CAN(s) or other Local sensors Messages IN (from Supervisor) Current Imperative (action now !) Future Conditional Imperative (action if !) |
| Outputs | Messages OUT (to Sub-systems) Current Imperative (action now !) Future Conditional Imperative (action if!) | Messages OUT (to Supervisor) Permission request to Supervisor for local action (can I open clutch, please?) Request to Supervisor for remote action in another system Local diagnostic Warning of local function limitation (current and predicted) |

In particular the commands from the supervisor (150) to the sub-systems (152) aim to provide the desired vehicle slip angle and yaw rate, as discussed above. Various techniques for achieving this will be well-known to the skilled reader as the dynamics and general control techniques are readily available. For example modelling can be used in conjunction with appropriate optimisation techniques. As a result detailed discussion is not entered into here although some general comments follow.

It will be appreciated that the sub-system actuator can comprise a wide range of elements including an engine management system, a transmission control unit, an exhaust treatment unit, torque vector differential elements, braking elements such as ABS control chassis control and so forth. Each of these is individually well known as are the interaction between them and discussion of torque vector differential is well known, for example, from UK patent applications numbers 0203026.0 and 0209654.3 One possible approach as an empirical one to assess how best to combine the various parameters using optimisation techniques. To achieve a given combination of yaw moment and vehicle slip angle various combinations of degrees of freedom such as transmission output torque, brake torque at each wheel and drive torque at each wheel may be feasible. However the cost of candidate combinations are likely to vary, presenting the opportunity to perform an optimisation of the cost to achieve a given level of performance.

This optimisation is based upon sensitivity studies which generate response surfaces for the main cost elements to establish main effects and interactions. The application of classical optimisation techniques can be achieved using derivative information extracted from the sensitivity studies to allow the interactions (up to 3rd order for example) to be expressed as a partial differential expression. However, a genetic algorithm (GA) search is preferred as it eliminates the requirement for this particular stage and gives greater confidence that global minima had been found.

A cost function of the following form was developed:

$$\text{Cost\_Function} = \sum_{i=\text{All\_vehicle\_systems}} w_i \sqrt{X_i^2}$$

Where, i is the particular cost species. Such costs would include: deviation from vehicle attribute targets or confidence metrics if compliance is not possible, actuator energy, brake temperature, NVH etc.

$X_i$ is the absolute cost of operating the sub-system at this candidate setpoint.

$w_i$ is the absolute weighting accorded to a particular cost species. These weightings would take the form of a schedule dependant upon factors such as the classification of the manoeuvre.

Data of the type used to populate the cost function can be, for example, the cost associated with generating the desired slip angle related to driver action associated with steering wheel displacement. Within the cost function generic targets may be included such as deviation from linear response or deviation from the desired understeer gradient. However, these may be replaced by measured characteristics to attempt a direct emulation of the characteristics of an image vehicle. Such targets are derived from benchmarking of preferred vehicles which relate to steady-state, dynamic response and steering feel, respectively.

As an alternative to empirical approaches, algorithmic or mathematically formulated approaches can also be adopted. For example a yaw rate controller can be introduced specifically directed to linking steering input to yaw rate (i.e. not taking into account accelerator pedal position). The reference model for this Yaw Rate Controller corresponds to a second-order filter. The parameters for this filter are obtained from a two-degree of freedom vehicle handling model and are specified such that an ideal under-steering characteristic is defined over the velocity operating range. To this end, the two-degree of freedom vehicle handling model, filter description and the velocity dependent parameter variation are described here.

The proposed reference model approach is explicit: the reference model defines the dynamic target performance; control design is separated and achievable with a Type 1 system; and calibration is meaningful.

Using the following notation:
a—Distance from front axle to C of G [m]
b—Distance from front axle to C of G [m]
C—Tyre stiffness coefficient [N/rad]

I—Vehicle yaw inertia [kg.m²]
K—Steady-state gain
m—Vehicle mass [kg]
r—Yaw rate [rad/s]
s—Laplace operator
V—Vehicle velocity [m/s]
δ—Angular displacement [rad]
ω—Natural frequency [rad/s]
ξ—Damping ratio [1]
Subscripts
c—Critical
f—Front
h—Hand-wheel
r—Rear
s—Steering
0—Zero velocity
∞ Infinite velocity the equations of motion for the two degree of freedom vehicle handling model can be written as:

$$\begin{Bmatrix} \dot{v} \\ \dot{r} \end{Bmatrix} = \begin{bmatrix} -\frac{C_0}{mV} & -\left(v + \frac{-C_0}{mV}\right) \\ \frac{-C_1}{IV} & \frac{-C_2}{IV} \end{bmatrix} \begin{Bmatrix} v \\ r \end{Bmatrix} + \begin{bmatrix} \frac{2C_f K_s}{m} \\ \frac{2aC_f K_s}{I} \end{bmatrix} \{\delta_n\} \quad (D1)$$

where $$C_0 = 2(C_f + C_r) \quad (D2)$$

$$C_1 = 2(aC_f - bC_r) \quad (D3)$$

and $$C_2 = 2(a^2 C_f + b^2 C_r) \quad (D4)$$

The differential equations given in D1 can be rearranged to give the transfer function that relates hand-wheel angular displacement to yaw rate as follows:

$$\frac{r(s)}{\delta_f(s)} = \frac{\frac{2aC_f K_s}{I}s + \frac{2C_f K_s}{mIV}(C_1 + aC_0)}{s^2 + \left(\frac{C_0}{mV} + \frac{C_2}{IV}\right)s + \left(\frac{C_0 C_2}{mIV^2} - \frac{C_1}{I} - \frac{C_1^2}{mIV}\right)} \quad (D5)$$

Equation D5 can be simplified by neglecting all transient effects introduced by the numerator, i.e.:

$$\frac{r(s)}{\delta_f(s)} = \frac{\frac{2C_f K_s}{mIV}(C_1 + aC_0)}{s^2 + \left(\frac{C_0}{mV} + \frac{C_2}{IV}\right)s + \left(\frac{C_0 C_2}{mIV^2} - \frac{C_1}{I} - \frac{C_1^2}{mIV}\right)} \quad (D6)$$

Equation D6 corresponds to a standard second-order filter and can be represented as follows:

$$\frac{r(s)}{\delta_f(s)} = \frac{K}{s^2 + 2\xi\omega s + \omega^2} \quad (D7)$$

Referring to equation D7 and reference [1], the steady-state gain, damping ratio and natural frequency parameters that will correspond to a typical under-steering vehicle can be obtained from the following expressions:

$$K_0 = \frac{\omega}{\omega_\infty} = \sqrt{1 + \left(\frac{V_c}{V}\right)^2} \quad (D8)$$

$$K_1 = \frac{\xi}{\xi_0} = \frac{1}{\sqrt{1 + \left(\frac{V}{V_c}\right)^2}} \quad (D9)$$

To summarise, equation D7 defines the reference model for the proposed Yaw Rate Controller and equations D8-D10 illustrate how the parameters of the reference model are dependent on the longitudinal velocity of the vehicle. As a result the adaptable parameters $\omega_\infty$ and $\xi_0$ allow variation of the steady state gain to achieve the desired performance.

Instead of using the reference model to define target performance yaw rate control, the same technique could also be applied to control slip angle. The methodology, whether applied for the control of yaw rate, slip-angle or other targets has the following benefits over other commonly used methods of defining control schemes for vehicles:

The reference model defines target performance, rather than multiple coupled maps.

The reference vehicle model is separate from the control structure, allowing the easy interchange of different vehicle models and control structures.

The calibration of the control target is has meaningful units more easily interpreted In order to enhance sub-system response to a set point command from the supervisor a feed forward system can be adopted. According to that system the subssystem contains a vehicle model. The sub-system operates under closed loop control whereby local sensors or vehicle sensors detect whether the sub-system is achieving the desired effect. In order to achieve the set point as quickly as possible the sub-system addresses the vehicle model in order to track the set point more quickly by assessing the likely compensations required.

It will be appreciated that the various aspects of the invention above can be combined or interchanged as appropriate. The invention is appropriate to any type of vehicle but in particular land vehicles. It can be applied to four wheel drive or front or rear wheel drive vehicles as appropriate and systems having any number of supervisory controlled sub-systems. The driver inputs can be combined or assessed individually and similarly vehicle parameter outputs can be selected from a range of possibilities as appropriate. The driver input devices can include any appropriate driver input and in any form such that, for example, non-steering wheel vehicle input is possible.

The invention claimed is:

1. A vehicle control system, comprising:
    a supervisor module, and
    a plurality of controller modules responsive to commands from the supervisor module, in which the supervisor module includes a control constraint set and is arranged to receive control demands from each of the controller modules and accede to the demands within the limits of the constraint set,
    the supervisor module achieving full integration with the controller modules by taking into account said control demands before sending control commands to controller modules,
    said control demands comprising local condition information, and said control commands comprising appropriate set points for said controller modules, such that desired vehicle output parameters are achieved.

2. The vehicle control system according to claim 1, wherein the supervisor module sends an operating envelope to one or more controller modules.

3. The vehicle control system according to claim 1, further comprising a global positioning system (GPS) to determine instantaneous vehicle position.

4. The vehicle control system according to claim 1, wherein local condition information is sensed by a sensor pack.

5. The vehicle control system according to claim 1, wherein said controller modules are configured to send predicted future local condition information to said supervisor module.

6. The vehicle control system according to claim 1, further comprising driver input to the supervisor module, said driver input including one or more of steering wheel angle, steering wheel turn rate, accelerator pedal position, accelerator pedal rate, gear ratio selected, engagement condition of brake and engagement condition clutch.

* * * * *